(12) United States Patent
Huang et al.

(10) Patent No.: US 11,822,204 B2
(45) Date of Patent: Nov. 21, 2023

(54) ELECTRONIC PAPER PACKAGE STRUCTURE

(71) Applicant: E Ink Holdings Inc., Hsinchu (TW)

(72) Inventors: Jen-Shiun Huang, Hsinchu (TW); Huang-Kai Shen, New Taipei (TW); Ko-Fan Tu, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 329 days.

(21) Appl. No.: 17/196,061

(22) Filed: Mar. 9, 2021

(65) Prior Publication Data

US 2021/0325758 A1    Oct. 21, 2021

(30) Foreign Application Priority Data

Apr. 21, 2020    (TW) .................... 109113229

(51) Int. Cl.
*G02F 1/1679*    (2019.01)
*G02F 1/1685*    (2019.01)
*G02F 1/167*    (2019.01)

(52) U.S. Cl.
CPC ............ *G02F 1/1679* (2019.01); *G02F 1/167* (2013.01); *G02F 1/1685* (2019.01)

(58) Field of Classification Search
CPC ....... G02F 1/1679; G02F 1/1685; G02F 1/167
See application file for complete search history.

(56) References Cited

U.S. PATENT DOCUMENTS

| | | | |
|---|---|---|---|
| 8,624,134 B2 | 1/2014 | Chen | |
| 8,908,257 B2 | 12/2014 | Song et al. | |
| 9,373,803 B2 | 6/2016 | Kao et al. | |
| 9,847,509 B2 | 12/2017 | Chen et al. | |
| 2008/0062506 A1 | 3/2008 | Sah | |
| 2010/0311490 A1* | 12/2010 | Miller | G07F 17/3293 463/16 |
| 2011/0292493 A1* | 12/2011 | Danner | G02F 1/1679 359/296 |
| 2017/0075492 A1 | 3/2017 | Kim et al. | |
| 2017/0133630 A1 | 5/2017 | Kim et al. | |
| 2018/0136527 A1 | 5/2018 | Park et al. | |

FOREIGN PATENT DOCUMENTS

| | | |
|---|---|---|
| CN | 202794791 U | 3/2013 |
| CN | 204101860 U | 1/2015 |
| TW | I366059 B | 6/2012 |
| TW | I421611 B | 1/2014 |
| TW | 201500213 A | 1/2015 |

OTHER PUBLICATIONS

Taiwan Office Action of TW-10921241080 dated Dec. 22, 2020.

* cited by examiner

*Primary Examiner* — Lucy P Chien

(74) *Attorney, Agent, or Firm* — Rabin & Berdo, P.C.

(57) ABSTRACT

An electronic paper package structure, including a substrate, an electronic ink layer, a cover plate, a water vapor barrier film and an adhesive layer, is provided. The electronic ink layer is disposed on the substrate. The cover plate covers the electronic ink layer. The water vapor barrier film covers the substrate and the electronic ink layer. The adhesive layer is directly bonded between the cover plate and the water vapor barrier film to seal the substrate and the electronic ink layer. The adhesive layer is not bonded between the cover plate and the electronic ink layer.

12 Claims, 3 Drawing Sheets

ELECTRONIC PAPER PACKAGE STRUCTURE

This application claims the benefit of Taiwan application Serial No. 109113229, filed Apr. 21, 2020, the subject matter of which is incorporated herein by reference.

BACKGROUND OF THE INVENTION

Field of the Invention

The invention relates in general to an electronic element package structure, and more particularly to an electronic paper package structure.

Description of the Related Art

Along with the advance in the flat display technology, more and more electronic products, particularly, portable electronic products, such as mobile phones, e-books, and digital cameras, are equipped with a display device. As the trend of portable electronic products is directed towards light weight, small size and slimness, the display device used in the portable electronic products also needs to possess the qualities of light weight, small size and slimness.

To promote the idea of going paperless, electronic signages, such as electrophoretic displays (EPD) or electronic paper displays (EPD), can replace the conventional printed billboards. The electronic signages not only possess the qualities of light weight and slimness but can also be equipped with flexibility.

Since the current package structure of electrophoretic displays or electronic paper displays requires two times of barrier film bonding, the cost is higher, and the water vapor barrier capacity is weaker.

SUMMARY OF THE INVENTION

The invention is directed to an electronic paper package structure capable of saving cost and increasing the water vapor barrier capacity.

According to one embodiment of the present invention, an electronic paper package structure is provided. The electronic paper package structure includes a substrate, an electronic ink layer, a cover plate, a water vapor barrier film and an adhesive layer. The electronic ink layer is disposed on the substrate. The cover plate covers the electronic ink layer. The water vapor barrier film covers the substrate and the electronic ink layer. The adhesive layer is directly bonded between the cover plate and the water vapor barrier film to seal the substrate and the electronic ink layer. The adhesive layer is not bonded between the cover plate and the electronic ink layer.

According to another embodiment of the present invention, an electronic paper package structure is provided. The electronic paper package structure includes a substrate, an electronic ink layer, a cover plate, a water vapor barrier film, an adhesive layer and a sealant. The substrate includes an outlet. The electronic ink layer is disposed on the substrate. The cover plate covers the electronic ink layer. The water vapor barrier film covers the substrate and the electronic ink layer. The adhesive layer is directly bonded between the cover plate and the water vapor barrier film, wherein the outlet is extended outside the cover plate, the electronic ink layer is located between the substrate and the cover plate, and a groove is defined by a lower surface of the cover plate, a side surface of the electronic ink layer and an upper surface of the outlet. The sealant is filled into the groove.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, an electronic paper package structure is provided. The electronic paper package structure includes a water vapor barrier film bonding the cover plate using one single adhesive layer to increase the water vapor barrier capacity of the electronic paper package structure and reduce the cost. In an embodiment, the water vapor barrier capacity is represented by water vapor transmission rate (WVTR). Under the condition that the temperature is 60° C. and the moisture is 90%, the water vapor transmission rate preferably is smaller than a value between 2-5 $g/m^2/day$, smaller than 1 $g/m^2/day$, smaller than 0.5 $g/m^2/day$, smaller than 0.1 $g/m^2/day$, or even smaller than 0.01 $g/m^2/day$.

Figure 1:
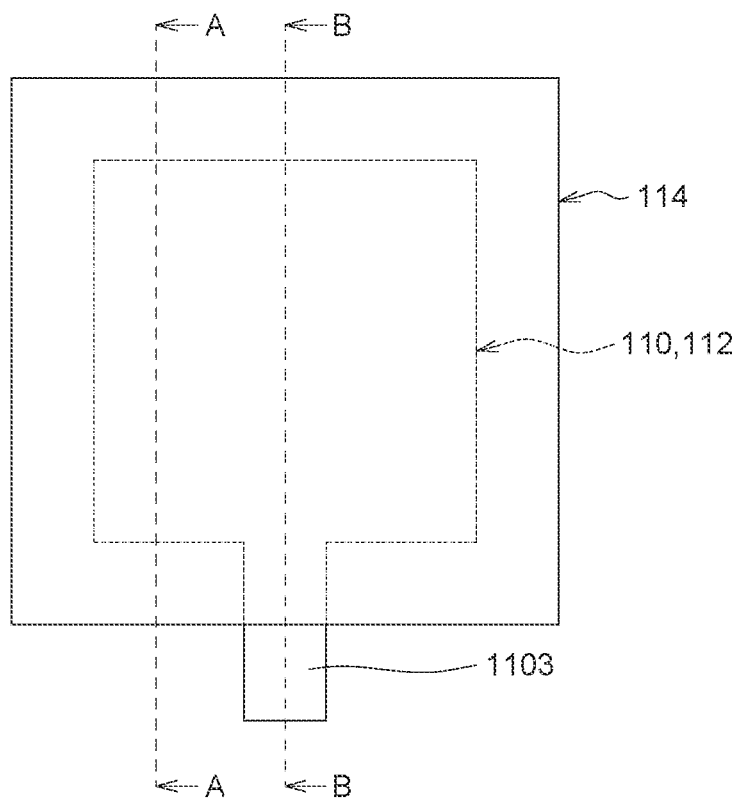
FIG. 1 is a top view of an electronic paper package structure according to an embodiment of the present invention.
Figure 2:
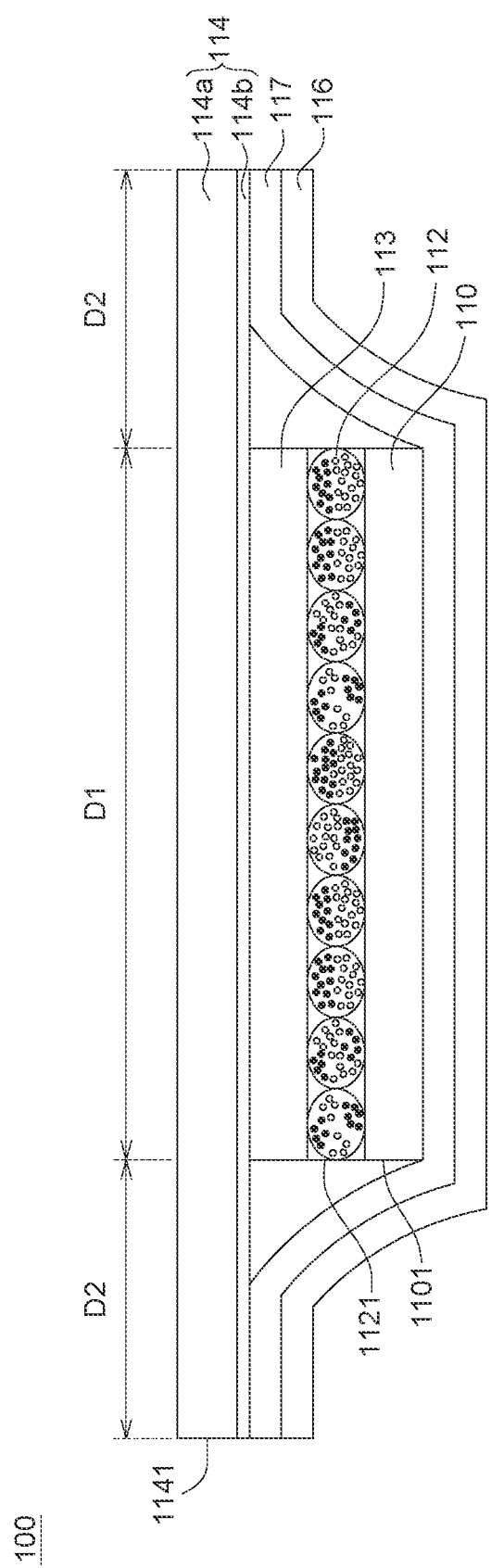
FIG. 2 is a cross-sectional view of an electronic paper package structure along a cross-sectional line A-A according to an embodiment of the present invention.
Figure 3:
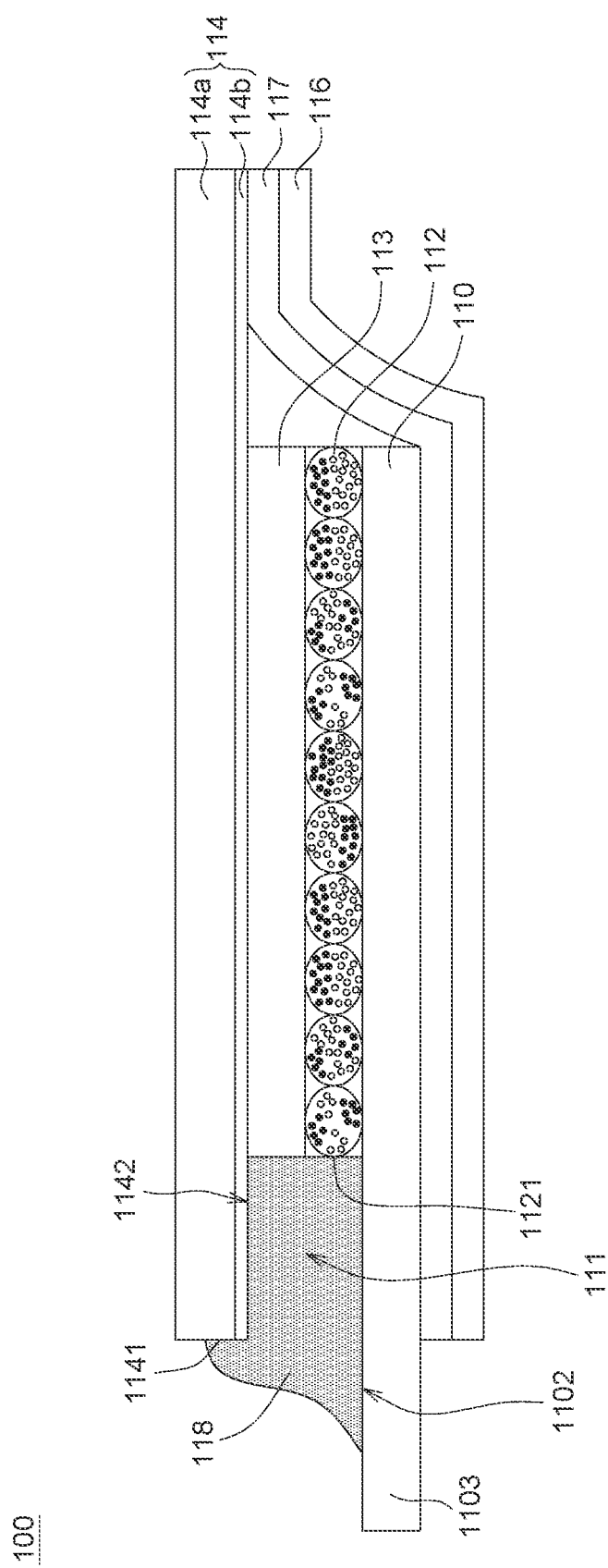
FIG. 3 is a cross-sectional view of electronic paper package structure along a cross-sectional line B-B according to an embodiment of the present invention.

Refer to FIGS. 1-3. FIG. 1 is a top view of an electronic paper package structure 100 according to an embodiment of the present invention. FIG. 2 is a cross-sectional view of electronic paper package structure 100 along a cross-sectional line A-A according to an embodiment of the present invention. FIG. 3 is a cross-sectional view of electronic paper package structure 100 along a cross-sectional line B-B according to an embodiment of the present invention.

In an embodiment, the electronic paper package structure 100 may include a substrate 110, an electronic ink layer 112, a cover plate 114, a water vapor barrier film 116, an adhesive layer 117 and a sealant 118.

The substrate 110, for example, can be a transparent glass, a plastic substrate or a non-transparent substrate. A thin-film transistor array (TFT array) or a conductive graphite is disposed on the upper surface 1102 of the substrate 110 and configured as a lower electrode plate. The cover plate 114 may include a transparent sheet 114a and a translucent water vapor barrier 114b. The transparent sheet 114a can be formed of glass or plastics such as polyethylene terephthalate (PET), polystyrene (PS) or polycarbonate (PC). The translucent water vapor barrier 114b can be formed of at least one of alumina (AlOx), silica, silicon nitride, titanium oxide, zirconium oxide, aluminum oxynitride, silicon oxynitride and amorphous carbon. The water vapor barrier capacity of the translucent water vapor barrier 114b is greater than that of the transparent sheet 114a. Moreover, a transparent electrode layer 113 formed of such as indium tin oxide (ITO) is disposed on the lower surface 1142 of the cover plate 114 and configured as an upper electrode plate.

The electronic ink layer 112 is disposed on the substrate 110 and located between the substrate 110 and the cover plate 114. The electronic ink layer 112 may include millions of microcapsules, each having electrophoretic particles, wherein the electrophoretic particles include white particles carrying positive charges and black particles carrying negative charges and are suspended in a transparent liquid. When the electrical field between the substrate 110 and the cover plate 114 is conducted, the electrophoretic particles are moved to the top of the microcapsules due to the attraction between positive and negative charges, such that white or black particles at corresponding blocks will be viewable to the viewers and show a pixel pattern. Additionally, the electronic ink layer 112 can be a tri-color or multi-color electronic ink layer such that a full color gamut display effect can be achieved. However, the present invention does not have specific restrictions regarding the said arrangement. Also, the electronic ink layer 112 can be the said microcapsules electronic ink layer or micro-cup electronic ink layer.

In an embodiment, the water vapor barrier film 116 is configured to seal the substrate 110 and the electronic ink layer 112, such that the substrate 110 and the electronic ink layer 112 are sealed between the cover plate 114 and the water vapor barrier film 116. Besides, the adhesive layer 117 is directly bonded between the cover plate 114 and the water vapor barrier film 116 to prevent external water vapor from entering the electronic paper package structure 100 via the adhesive layer 117, such that the water vapor barrier capacity of the electronic paper package structure 100 can be increased. In an embodiment, the thickness of the adhesive layer 117 is about 25 μm. When the conventional method is used, two barrier films are bonded using a double adhesive layer whose thickness is two times (about 50 μm) of a single adhesive layer (about 25 μm), therefore more external water vapor can enter the electronic paper package structure 100 via the double adhesive layer. In the present embodiment, a single adhesive layer 117 is directly bonded between the cover plate 114 and the water vapor barrier film 116, not only saving the cost but further increasing the water vapor barrier capacity of the electronic paper package structure 100.

In the present embodiment, one single adhesive layer 117 is directly bonded between the cover plate 114 and the water vapor barrier film 116, and the adhesive layer 117 is not bonded between the cover plate 114 and the electronic ink layer 112.

The material of the water vapor barrier film 116 includes a high molecular polymer, such as epoxy resin, polyurethane (PU) and silicone, as well as an aluminum foil or at least one material selected from alumina (AlOx), silica, silicon nitride, titanium oxide, zirconium oxide, aluminum oxynitride, silicon oxynitride and amorphous carbon. In an embodiment, the water vapor barrier film 116 covers the surroundings of the substrate 110 and the electronic ink layer 112, wherein the electronic ink layer 112 is correspondingly displayed in a display area D1 of the cover plate 114, and the adhesive layer 117 is correspondingly bonded to a non-display area D2 of the cover plate 114.

As indicated in FIG. 2, the side surface 1121 of the electronic ink layer 112 is basically aligned with the side surface 1101 of the substrate 110 or the side surface 1101 of the substrate 110 is protruded from the side surface 1121 of the electronic ink layer 112 by a first distance, and the side surface 1121 of the electronic ink layer 112 is separated from the side surface 1141 of the cover plate 114 by a second distance (that is, the width of the non-display area D2, such as 2 mm). The second distance is greater than the first distance and allows the electronic ink layer 112 to be hidden between the substrate 110 and the cover plate 114, such that the water vapor barrier distance can be increased and external water vapor will not infiltrate the electronic ink layer 112.

Refer to FIGS. 1 and 3. The substrate 110 may include an outlet 1103 configured to input/output a signal. The outlet 1103 is extended outside the cover plate 114, and a groove 111 is defined by a lower surface 1142 of the cover plate 114, a side surface 1121 of the electronic ink layer 112 and an upper surface 1102 of the outlet 1103. In the present embodiment, the sealant 118 can be filled into the groove 111 to avoid external water vapor infiltrating the electronic ink layer 112. The sealant 118 can be a thermoplastic, a thermosetting, a UV curing or a room-temperature curing polymer hardened glue, and the present invention is not limited thereto.

Since the sealant 118 is already sealed between the outlet 1103 of the substrate 110 and the cover plate 114, the adhesive layer 117 is no more needed to be bonded between the substrate 110 and the cover plate 114 and the amount of the adhesive layer 117 can be reduced.

According to the electronic paper package structure disclosed in above embodiments of the present invention, the water vapor barrier film only needs to be bonded once, the manufacturing process is simplified, and the cost is lower. Since the adhesive layer has a slim thickness (the thickness is smaller than 25 μm) and the gap between the cover plate and the water vapor barrier film is reduced (the gap is smaller than 25 μm), external water vapor can hardly enter the electronic paper package structure via the adhesive layer, and the water vapor barrier capacity of the electronic paper package structure can be increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic paper package structure, comprising:
a substrate;
an electronic ink layer disposed on the substrate, the substrate having a bottom surface not bonded to the electronic ink layer;
a cover plate configured to cover the electronic ink layer;
a water vapor barrier film configured to cover the substrate and the electronic ink layer; and
an adhesive layer directly bonded between the cover plate and the water vapor barrier film, and directly bonded and extending between the water vapor barrier film and the bottom surface of the substrate, wherein the adhesive layer is not bonded between the cover plate and the electronic ink layer, and wherein the water vapor barrier film and the adhesive layer are conformal in shape to seal and cover the substrate and the electronic ink layer.

2. The electronic paper package structure according to claim 1, wherein the cover plate comprises a transparent sheet and a translucent water vapor barrier.

3. The electronic paper package structure according to claim 1, wherein the cover plate comprises a display area and a non-display area, the display area correspondingly displays the electronic ink layer, and the non-display area is correspondingly bonded to the adhesive layer.

4. The electronic paper package structure according to claim 1, wherein a side surface of the substrate is protruded from a side surface of the electronic ink layer by a first distance, the side surface of the electronic ink layer is separated from a side surface of the cover plate by a second distance, and the second distance is greater than the first distance.

5. The electronic paper package structure according to claim 1, wherein the substrate comprises an outlet extended outside the cover plate, the electronic ink layer is located between the substrate and the cover plate, and a groove is defined by a lower surface of the cover plate, a side surface of the electronic ink layer and an upper surface of the outlet.

6. The electronic paper package structure according to claim 5, further comprising a sealant filled into the groove.

7. The electronic paper package structure according to claim 5, wherein the adhesive layer is not bonded between the cover plate and the outlet.

8. An electronic paper package structure, comprising:
a substrate, comprising an outlet;
an electronic ink layer disposed on the substrate, the substrate having a bottom surface not bonded to the electronic ink layer;
a cover plate configured to cover the electronic ink layer;
a water vapor barrier film configured to cover the substrate and the electronic ink layer;
an adhesive layer directly bonded between the cover plate and the water vapor barrier film and directly bonded and extending between the water vapor barrier film and the bottom surface of the substrate, wherein the water vapor barrier film and the adhesive layer are conformal in shape to seal and cover the substrate and the electronic ink layer, and wherein the outlet is extended outside the cover plate, the electronic ink layer is located between the substrate and the cover plate, and a groove is defined by a lower surface of the cover plate, a side surface of the electronic ink layer and an upper surface of the outlet; and
a sealant filled into the groove.

9. The electronic paper package structure according to claim 8, wherein the adhesive layer is not bonded between the cover plate and the electronic ink layer.

10. The electronic paper package structure according to claim 8, wherein the adhesive layer is not bonded between the cover plate and the outlet.

11. The electronic paper package structure according to claim 8, wherein the cover plate comprises a transparent sheet and a translucent water vapor barrier.

12. The electronic paper package structure according to claim 8, wherein the cover plate comprises a display area and a non-display area, the display area correspondingly displays the electronic ink layer, and the non-display area is correspondingly bonded to the adhesive layer.

\* \* \* \* \*